(12) United States Patent
Yamada et al.

(10) Patent No.: US 12,436,185 B2
(45) Date of Patent: Oct. 7, 2025

(54) TEMPERATURE ADJUSTING DEVICE, ELECTRONIC COMPONENT HANDLING APPARATUS, AND ELECTRONIC COMPONENT TEST APPARATUS

(71) Applicant: ADVANTEST Corporation, Tokyo (JP)

(72) Inventors: Yuya Yamada, Tokyo (JP); Aritomo Kikuchi, Tokyo (JP); Yasuyuki Kato, Tokyo (JP)

(73) Assignee: ADVANTEST Corporation, Tokyo (JP)

( * ) Notice: Subject to any disclaimer, the term of this patent is extended or adjusted under 35 U.S.C. 154(b) by 375 days.

(21) Appl. No.: 18/163,056

(22) Filed: Feb. 1, 2023

(65) Prior Publication Data

US 2023/0296666 A1    Sep. 21, 2023

(30) Foreign Application Priority Data

Mar. 16, 2022 (JP) ................. 2022-041584

(51) Int. Cl.
*G01R 31/28* (2006.01)
*F28F 13/12* (2006.01)

(52) U.S. Cl.
CPC ........ *G01R 31/2877* (2013.01); *F28F 13/125* (2013.01); *G01R 31/2886* (2013.01)

(58) Field of Classification Search
CPC ............ G01R 31/28; G01R 31/2875; G01R 31/2877; G01R 31/2886; G01R 31/2863;

(Continued)

(56) References Cited

U.S. PATENT DOCUMENTS

| 6,750,668 B1 | 6/2004 | Johnson |
| 2003/0167790 A1* | 9/2003 | Koike ................ F25B 15/04 62/476 |

(Continued)

FOREIGN PATENT DOCUMENTS

| CN | 109387800 A | 2/2019 |
| CN | 105940294 B | 1/2020 |

(Continued)

OTHER PUBLICATIONS

Office Action issued in corresponding Korean Patent Application No. 10-2023-0005300, dated Dec. 6, 2024, with translation (11 pages).

(Continued)

*Primary Examiner* — Son T Le
(74) *Attorney, Agent, or Firm* — Osha Bergman Watanabe & Burton LLP

(57) ABSTRACT

A temperature adjusting device includes: a fluid connector connected to a fluid supply source; a heat exchanger thermally connected to a DUT or a carrier holding the DUT being pressed against a socket; a first flow path passing through an inside of the heat exchanger; a first swirl flow forming part that supplies a first swirl flow to the first flow path, the first swirl flow swirling along an inner surface of the first flow path around a first central axis of the first flow path; and a second flow path disposed on an upstream side of the first flow path and connected to the first flow path. The second flow path has a second central axis not intersecting the first central axis, and the first swirl flow forming part is a first connection part where the first and second flow paths are connected to each other.

15 Claims, 9 Drawing Sheets

(58) Field of Classification Search
CPC ............ G01R 31/2867; G01R 31/2868; G01R 31/2887; G01R 31/2889; F28F 13/00; F28F 13/12; F28F 13/125
See application file for complete search history.

(56) References Cited

U.S. PATENT DOCUMENTS

| | | |
|---|---|---|
| 2012/0112777 A1 | 5/2012 | Aizawa et al. |
| 2016/0334323 A1 | 11/2016 | Mcguinness et al. |
| 2016/0334351 A1 | 11/2016 | Lu et al. |
| 2016/0377567 A1 | 12/2016 | Lu et al. |
| 2019/0041470 A1 | 2/2019 | Endo et al. |
| 2020/0371158 A1* | 11/2020 | Kato .................... G01R 1/0466 |

FOREIGN PATENT DOCUMENTS

| | | |
|---|---|---|
| JP | 2005265665 A | 9/2005 |
| JP | 2017-49017 A | 3/2017 |
| KR | 10-2009-0059434 A | 6/2009 |
| KR | 10-2017-0116875 A | 10/2017 |
| WO | 2011007419 A1 | 1/2011 |

OTHER PUBLICATIONS

Office Action issued in corresponding Taiwanese Patent Application No. 111150587, dated Dec. 19, 2023 (4 pages).

\* cited by examiner

TEMPERATURE ADJUSTING DEVICE, ELECTRONIC COMPONENT HANDLING APPARATUS, AND ELECTRONIC COMPONENT TEST APPARATUS

CROSS-REFERENCE TO RELATED APPLICATIONS

The present application claims priority from Japanese Patent Application No. 2022-041584 filed on Mar. 16, 2022, the contents of which are incorporated herein by reference in their entirety.

BACKGROUND

Technical Field

The present invention relates to a temperature adjusting device, an electronic component handling apparatus and an electronic component test apparatus that use for testing an electronic component under test (DUT: Device Under Test) such as a semiconductor integrated circuit device.

Description of Related Art

An electronic component test apparatus includes a test unit that tests an IC device, and a device transfer head that transfers the IC device to the test unit (refer to, for example, Patent Document 1). The device transfer head presses the IC device against the socket when the IC device is tested. Thereby, the terminal of the IC device contacts the probe pin of the test unit, and the terminal and the prob pin are electronically connected.

The device transfer head has a plurality of heads and a holding part that is connected to the lower portion of the heads and holds the IC device. A flow path is formed inside the head, and a coolant such as liquid nitrogen is supplied from a cooling mechanism to the flow path. In this way, the IC device is cooled via the holding part by the coolant flowing through the flow path of the head (refer to, for example, Patent Document 1 (paragraph [0108] and FIG. 4 to FIG. 8)).

PATENT DOCUMENT

PATENT DOCUMENT 1: JP 2017-49017 A1

However, the heat exchange efficiency between the coolant and the IC device is not sufficient and the responsiveness in temperature adjustment may decrease in the above-described electronic component test apparatus.

SUMMARY

One or more embodiments of the present invention provide a temperature adjusting device, an electronic component handling apparatus and an electronic component test apparatus capable of improving the responsiveness in temperature adjustment of the DUT.

[1] A temperature adjusting device according to one or more embodiments of the invention is a temperature adjusting device that adjusts a temperature of a device under test (DUT) electrically connected to a socket, the temperature adjusting device comprising: a fluid connection part (i.e., a fluid connector) connected to a fluid supply source that supplies a fluid; a heat exchanger thermally connected to at least one of the DUT and a carrier holding the DUT in a state that the at least one of the DUT and the carrier is pressed against the socket; a first flow path passing through an inside of the heat exchanger; and a first swirl flow forming part that swirls a flow of the fluid to form a first swirl flow and supplies the first swirl flow to the first flow path, wherein the first swirl flow is a flow of the fluid that swirls along an inner surface of the first flow path around a first central axis of the first flow path.

[2] In one or more embodiments of the invention, the temperature adjusting device may further comprise a second flow path disposed on an upstream side of the first flow path and connected to the first flow path, the second flow path may have a second central axis that does not intersect the first central axis, and the first swirl flow forming part may be a first connection part where the first flow path and the second flow path are connected to each other.

[3] In one or more embodiments of the invention, a cross section of the first flow path along a radial direction of the first flow path may have a circular shape, the first flow path may include a first opening that is formed in an inner circumferential surface of the first flow path, the second flow path may include a second opening that is formed at a first end of the second flow path, and the first opening and the second opening may be connected to each other in the first connection part.

[4] In one or more embodiments of the invention, a part of the inner surface of the second flow path may be connected with a part of the inner circumferential surface of the first flow path in the first connection part in a flush shape.

[5] In one or more embodiments of the invention, an intersection angle between a first virtual straight line and a second virtual straight line may be 90° to 120°, the first virtual straight line may be a virtual straight line obtained by projecting the first central axis onto a first virtual plane, the second virtual straight line may be a virtual straight line obtained by projecting the second central axis onto the first virtual plane, and the first virtual plane may be a virtual plane that is parallel to the first central axis and the second central axis.

[6] In one or more embodiments of the invention, the temperature adjusting device may further comprise: a third flow path disposed on an upstream side of the second flow path and connected to the second flow path; and a second swirl flow forming part that swirls a flow of the fluid to form a second swirl flow and supplies the second swirl flow to the third flow path, the second swirl flow may be a flow of the fluid that swirls along an inner surface of the third flow path around a third central axis of the third flow path.

[7] In one or more embodiments of the invention, a cross section of the third flow path along a radial direction of the third flow path may have a circular shape, the second flow path may include a third opening that is formed at a second end of the second flow path, the third flow path may include a fourth opening that is formed in an inner circumferential surface of the third flow path, and the third opening and the fourth opening may be connected to each other.

[8] In one or more embodiments of the invention, an intersection angle between a third virtual straight line and a fourth virtual straight line may be 90° to 120°, the third virtual straight line may be a virtual straight line obtained by projecting the second central axis onto a second virtual plane, the fourth virtual straight line may be a virtual straight line obtained by projecting the third central axis onto the second virtual plane, and the second virtual plane may be a virtual plane that is parallel to the second central axis and the third central axis.

[9] In one or more embodiments of the invention, the temperature adjusting device may further comprise a fourth flow path disposed on an upstream side of the third flow path and connected to the third flow path, the fourth flow path may have a fourth central axis that does not intersect the third central axis, and the second swirl flow forming part may be a second connection part where the third flow path and the fourth flow path are connected to each other.

[10] In one or more embodiments of the invention, a cross section of the third flow path along a radial direction of the third flow path may be a circular shape, the third flow path may include a fifth opening that is formed in an inner circumferential surface of the third flow path, the fourth flow path may include a sixth opening that is formed at a third end of the fourth flow path, and the fifth opening and the sixth opening may be connected to each other in the second connection part.

[11] In one or more embodiments of the invention, a part of the inner surface of the fourth flow path may be connected with a part of the inner circumferential surface of the third flow path in the second connection part in a flush shape.

[12] In one or more embodiments of the invention, an intersection angle between a fifth virtual straight line and a sixth virtual straight line may be 90° to 120°, the fifth virtual straight line may be a virtual straight line obtained by projecting the third central axis onto a third virtual plane, the sixth virtual straight line may be a virtual straight line obtained by projecting the fourth central axis onto the third virtual plane, and the third virtual plane may be a virtual plane that is parallel to the third central axis and the fourth central axis.

[13] In one or more embodiments of the invention, the temperature adjusting device may further comprise a plurality of the first flow paths and a plurality of the second flow paths, the single first flow path may be connected to the single second flow path, and the plurality of second flow paths may be connected to the single third flow path.

[14] In one or more embodiments of the invention, the first flow path may have a spiral wall disposed on an inner surface of the first flow path and extending in a spiral shape.

[15] In one or more embodiments of the invention, the first flow path may include a through hole formed inside the heat exchanger, the spiral wall may be erected along a radial direction of the first flow path, the spiral wall may have a height to a position away from the first central axis of the first flow path so that the through hole continuously penetrates along an extending direction of the first flow path.

[16] In one or more embodiments of the invention, a female thread may be formed by the spiral wall on the inner surface of the first flow path.

[17] In one or more embodiments of the invention, the fluid may be mist-like or liquid-like nitrogen.

[18] In one or more embodiments of the invention, the first flow path may extend inside the heat exchanger in a straight-line shape.

[19] In one or more embodiments of the invention, the temperature adjusting device may further comprise a heater that serves as a heating source and is disposed above or below the heat exchanger.

[20] An electronic component handling apparatus according to one or more embodiments of the invention is an electronic component handling apparatus that handles at least one of a DUT and a carrier holding the DUT, the electronic component handling apparatus comprising a pushing device that presses the at least one of the DUT and the carrier against the socket, wherein the pushing device comprises the temperature adjusting device described above.

[21] An electronic component test apparatus according to one or more embodiments of the invention is an electronic component test apparatus that tests a DUT, the electronic component test apparatus comprising: the electronic component handling apparatus described above; and a tester that comprises the socket.

In one or more embodiments of the present invention, the fluid flows while swirling around the first central axis along the inner surface of the first flow path. Therefore, it is possible to increase the contact distance between the fluid and the inner surface of the first flow path, and it is possible to increase the velocity of the fluid in the vicinity of the inner surface of the first flow path. Accordingly, since it is possible to improve the heat exchange efficiency between the fluid and the DUT, it is possible to improve the responsiveness in temperature adjustment of the DUT.

DETAILED DESCRIPTION OF EMBODIMENTS

Figure 1:
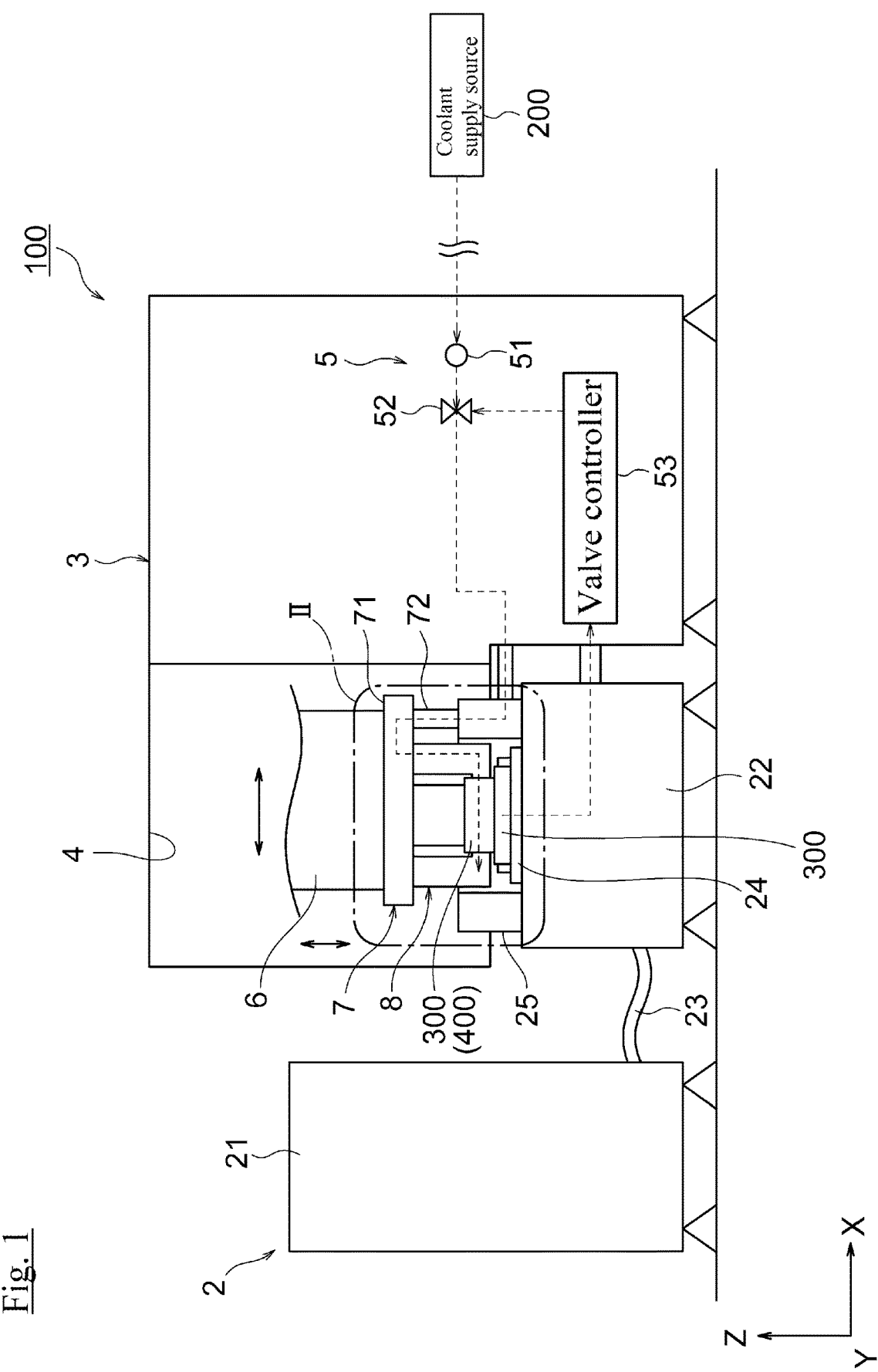
FIG. 1 is a block diagram showing an example of the configuration of an electronic component test apparatus in one or more embodiments of the present invention.
Figure 2:
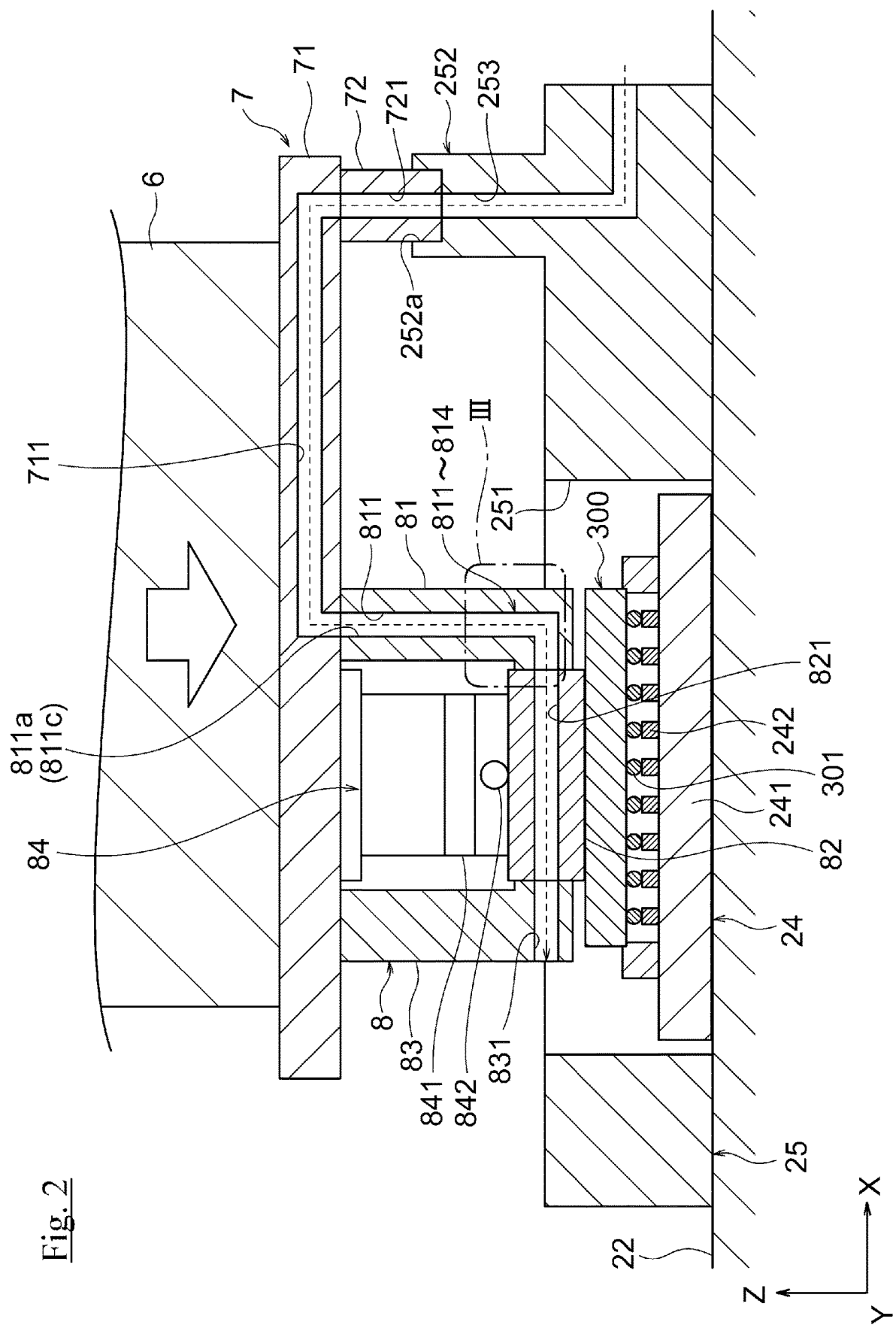
FIG. 2 is an enlarged cross-sectional view showing II portion of FIG. 1.

Hereinafter, embodiments of the invention will be described with reference to the drawings. FIG. 1 is a block diagram showing an example of the configuration of an electronic component test apparatus 100 in one or more embodiments. FIG. 2 is an enlarged cross-sectional view showing II portion of FIG. 1.

An electronic component test apparatus 100 of one or more embodiments shown in FIG. 1 is an apparatus that tests electrical characteristics of a DUT 300. As specific example of the DUT100 to be tested, SoC (System on a chip), logic devices, and memory devices can be exemplified.

As shown FIG. 1, the electronic component test apparatus 100 includes a tester 2 that tests the DUT 300 and a handler 3 that transfers the DUT 300 and presses the DUT 300 against socket 24. The handler 3 corresponds to an example of the "electronic component handling apparatus" in one or more embodiments of the present invention.

The tester 2 includes a main frame 21 and a test head 22. The main frame 21 is connected to the test head 22 via a cable 23. The main frame 21 transmits test signals to the DUT 300 via the test head 22 to test the DUT 300 and evaluates the DUT 300 according to the test result. The test head 22 transmits the test signals sent from the main frame 21 to the DUT 300 when testing the DUT 300.

As shown FIG. 2, the test head 22 is electrically connected to the DUT 300 via the socket 24. The socket 24 includes a socket body 241 and contactors 242. The socket body 241 is attached to the top surface of the test head 22. The contactors 242 are arranged in the socket body 241.

The contactors 242 are electrically connected to a load board (not shown) or the like disposed on the upper surface of the test head 22 and is also electrically connected to the DUT 300 by contacting the terminal 301 of the DUT 300. Although pogo pins are used as the contactors 242 in one or more embodiments, contactors other than pogo pins may be used as the contactors 242. For example, cantilever type probe needles, an anisotropic conductive rubber sheet, or a membrane type contactor having bumps formed on the insulating film may be used.

As shown in FIG. 2, a socket guide 25 is arranged to surround the socket 24. The socket guide 25 has a socket accommodation part 251, a fitting part 252 and a first flow hole 253. The socket accommodation part 251 is a through hole penetrating the socket guide 25. The socket 24 is arranged inside the socket accommodation part 251.

The fitting part 252 of one or more embodiments is a cylindrical portion that protrudes in the +Z direction in the drawing. The fitting part 252 includes a fitting hole 252a. The fitting hole 252a is a hole into which a fitting pin 72 (described later) of the pusher 7 (described later) is fitted. It is also possible to position the DUT 300 held by the pusher 7 and the socket 24 using the fitting hole 252a.

A lower portion of the fitting hole 252a is connected to the first flow hole 253. The first flow hole 253 of one or more embodiments is a through hole penetrating from the fitting part 252 to the side surface of the socket guide 25. The first flow hole 253 is connected to a second flow hole 721 (described later) formed inside the fitting pin 72 of the pusher 7 when the fitting pin 72 is fitted in the fitting hole 252a. A coolant is supplied from the coolant supply source 200 to the first flow hole 253 via the handler 3, and the coolant that has passed through the first flow hole 253 is supplied to the interior of the pusher 7 via the second flow hole 721.

As shown in FIG. 1, the handler 3 includes a thermostatic chamber 4, a coolant supply unit 5, a contact arm 6 and a pusher 7. The pusher 7 corresponds to an example of the "pushing device" in one or more embodiments of the present invention.

The thermostatic chamber 4 can adjust the temperature of the internal atmosphere to a desired temperature and can apply high or low temperature to the DUT 300. Although not particularly limited, the thermostatic chamber 4 can adjust the temperature in the range of −55° C. to +155° C., for example. The thermostatic chamber 4 accommodates a contact arm 6 and a pusher 7. Furthermore, the thermostatic chamber 4 accommodates the socket 24 through an opening formed in the bottom of the thermostatic chamber 4. The handler 3 may not include the thermostatic chamber 4.

The coolant supply unit 5 supplies coolant to the first flow hole 253 of the socket guide 25. The coolant supply section 5 includes a fluid connection part (or a fluid connector) 51, a valve 52 and a valve controller 53. The fluid connection part 51 is connected to a coolant supply source 200 disposed outside the electronic component test apparatus 100 so that the coolant is able to flow. The coolant supplied by the coolant supply source 200 includes compressed dry air, or gaseous, mist-like, or liquid-like nitrogen. When the coolant supply source 200 supplies the compressed dry air, the coolant supply source 200 may, for example, include a compressor to take in and compress ambient air and a dryer to dry the compressed air. Alternatively, the coolant supply source 200 may be an existing factory pipe or the like capable of supplying compressed dry air. When the coolant supply source 200 supplies gaseous, mist-like, or liquid-like nitrogen, the coolant supply source 200 may be, for example, a pressure vessel storing liquid nitrogen at a high pressure, or a factory pipe for supplying liquid nitrogen. Alternatively, a hot medium may be supplied instead of the coolant. The coolant and hot medium (liquid for adjusting the temperature of the DUT 300) corresponds to an example of the "fluid" in one or more embodiments of the present invention.

A valve 52 is disposed on the downstream side of the fluid connection part 51. The valve 52 adjusts the flow rate of the coolant supplied from the coolant supply source 200. As shown in FIG. 2, the coolant that has passed through the valve 52 is supplied to the first flow hole 253 of the socket guide 25 disposed on the downstream side of the valve 52.

As shown in FIG. 1, the valve controller 53 controls opening and closing of the valve 52. The valve controller 53 of one or more embodiments receives the detection value of the temperature detection circuit (not shown) of the DUT 300. The valve controller 53 performs PID control based on the input detection value so that the temperature of the DUT 300 becomes a desired value. The control method of the valve controller 53 is not limited to PID control, and other control methods may be used. As a specific example of the temperature detection circuit of the DUT 300, for example, a circuit including a thermal diode can be used. Alternatively, a thermocouple, an element having temperature dependent resistance characteristics or temperature dependent bandgap characteristics, or the like can also be used.

The contact arm 6 is supported by rails (not shown) included in the handler 3. The contact arm 6 includes an actuator (not shown) for horizontal movement and can move back and forth and left and right along a rail. Further, the contact arm 6 includes an actuator (not shown) for vertical driving and can move in the vertical direction.

The pusher 7 is disposed at the lower end of the contact arm 6. As shown in FIG. 2, the pusher 7 holds the DUT 300 and presses the DUT 300 against the socket 24. The pusher 7 includes a pusher base 71, a fitting pin 72 and a temperature control device 8.

The pusher base 71 of one or more embodiments is a plate-like member. The pusher base 71 is connected to the lower end of contact arm 6. The pusher base 71 has a third flow hole 711 through which a coolant flows. The third flow hole 711 is disposed on the downstream side of the second flow hole 721, and one end of the third flow hole 711 is connected to the second flow hole 721. The other end of the third flow hole 711 is connected to a fourth flow hole 811 (described later).

The fitting pin 72 is disposed on the lower surface of the pusher base 71. A second flow hole 721 through which a coolant flows is formed inside the fitting pin 72. The second flow hole 721 is a through hole that passes through the fitting pin 72 in the Z direction. The fitting pin 72 is inserted into the fitting hole 252a of the fitting part 252 when the contact arm 6 lowers the pusher 7. At this time, the second flow hole 721 is connected to the first flow hole 253 and is disposed on the downstream of the first flow hole 253.

The temperature adjusting device 8 is connected to the lower surface of the pusher base 71. The temperature adjustment apparatus 8 adjusts the temperature of the DUT 300. The temperature adjusting device 8 includes a first manifold 81, a heat exchange member 82, a second manifold 83 and a heater unit 84.

As shown in FIG. 2, the first manifold 81 is connected to the lower surface of the pusher base 71. The first manifold 81 of one or more embodiments is a member for branching a single flow path into a plurality of flow paths.

Figure 3:
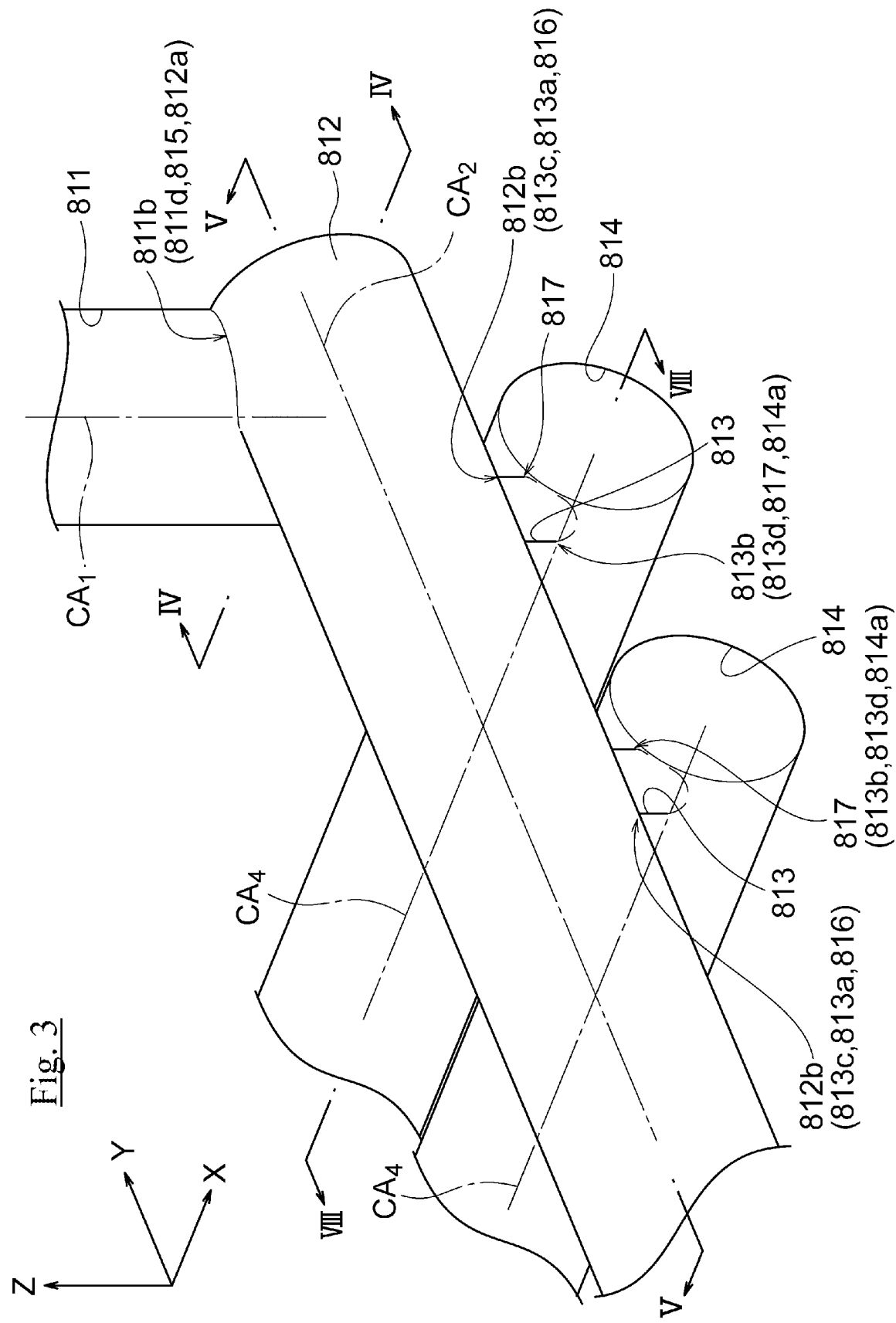
FIG. 3 is an enlarged perspective view showing fourth to eighth flow paths in III portion of FIG. 2.

FIG. 3 is an enlarged perspective view showing fourth to eighth flow holes 811 to 814 and 821 in III portion of FIG. 2. As shown in FIG. 2 and FIG. 3, the first manifold 81 includes a fourth flow hole 811, a fifth flow hole 812, a plurality of sixth flow hole 813 and a plurality of seventh flow hole 814, and the coolant flows inside the flow holes 811 to 814

The fourth flow hole 811 is a hole extending linearly along the Z direction in the drawing in the first manifold 81. The fourth flow hole 811 of one or more embodiments has a cylindrical shape, and the cross-sectional shape of the fourth flow hole 811 in the radial direction is circular. It is not necessary that the fourth flow hole 811 extends linearly, and the fourth flow hole may extend curvedly, for example. The cross-sectional shape of the fourth flow hole 811 is not limited to a circular shape and may be a polygonal shape such as a rectangle. The fourth flow hole 811 corresponds to an example of the "fourth flow path" in one or more embodiments of the present invention.

The fourth flow hole 811 is disposed on the downstream side of the third flow hole 711. The fourth flow hole 811 includes a pair of end openings 811a and 811b. As shown in FIG. 2, the end opening 811a is formed at the upper end 811c of the fourth flow hole 811 and is connected to the other end of the third flow hole 711 described above. On the other hand, as shown in FIG. 3, the end opening 811b is formed at the lower end 811d of the fourth flow hole 811 and is connected to the fifth flow hole 812. The lower end 811d corresponds to an example of the "third end" in one or more embodiments of the present invention, and the end opening 811b corresponds to an example of the "sixth opening" in one or more embodiments of the present invention.

Figure 4:
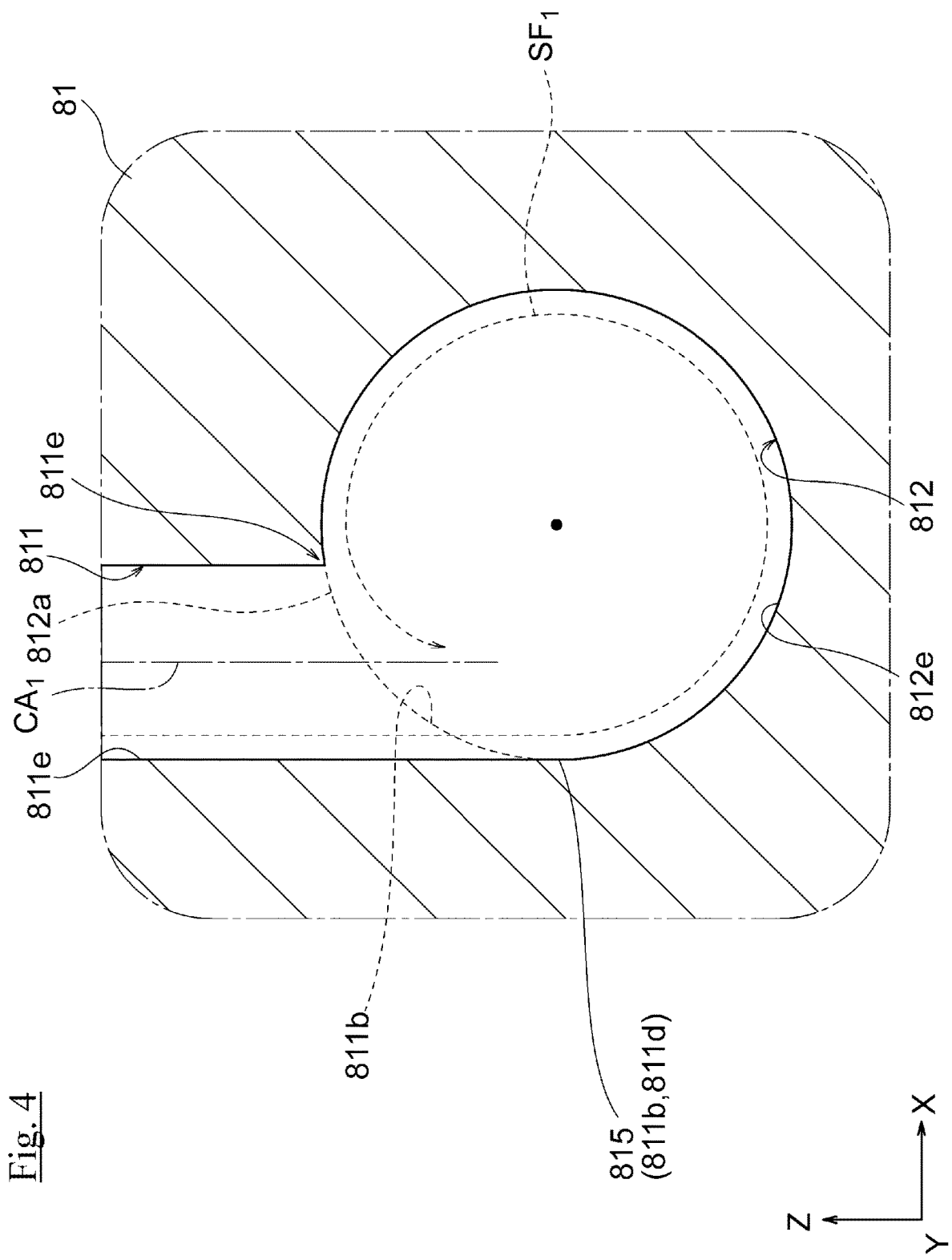
FIG. 4 is a cross-sectional view taken along IV-IV line of FIG. 3.
Figure 5:
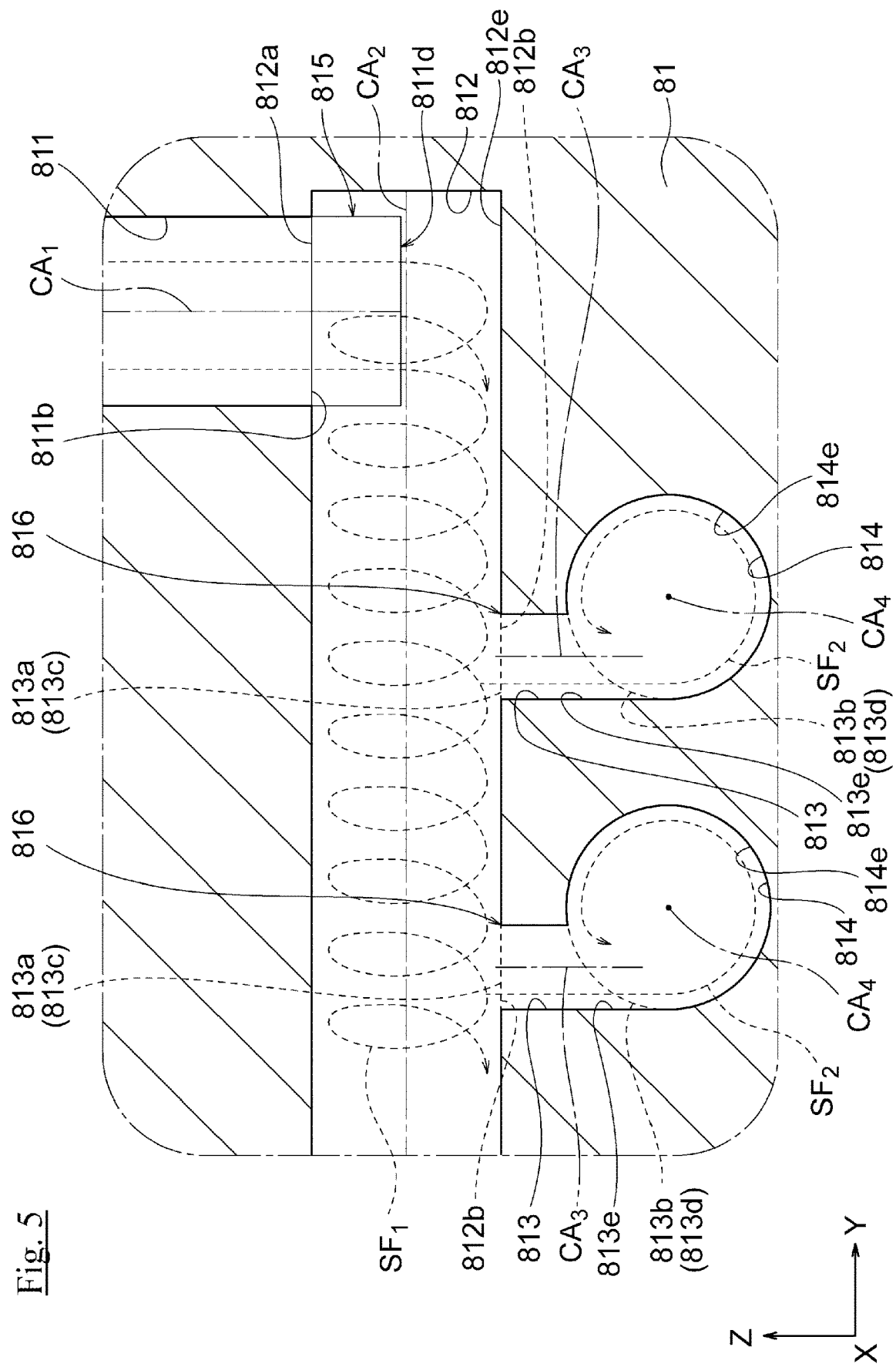
FIG. 5 is a cross-sectional view taken along V-V line of FIG. 3.

FIG. 4 is a cross-sectional view taken along IV-IV line of FIG. 3, and FIG. 5 is a cross-sectional view taken along V-V line of FIG. 3. As shown in FIG. 3 to FIG. 5, the fifth flow hole 812 is a hole extending linearly along the Y direction in the drawing in the first manifold 81. The fifth flow hole 812 of one or more embodiments also has a cylindrical shape similarly to the fourth flow hole 811, and the cross-sectional shape of the fifth flow hole 812 in the radial direction is also circular. The fifth flow hole 812 corresponds to an example of the "third flow path" in one or more embodiments of the present invention.

As shown in FIG. 4, the fifth flow hole 812 is disposed on the downstream side of the fourth flow hole 811 to cross the lower end 811d of the fourth flow hole 811 in the connection part 815. As shown in FIG. 5, the fifth flow hole 812 has a single inner circumferential surface opening 812a and a plurality of inner circumferential surface openings 812b on an inner circumferential surface 812e. The inner circumferential surface opening 812a is connected to the end opening 811b of the fourth flow hole 811, and the fourth flow hole 811 and the fifth flow hole 812 are connected to each other in the connection part 815. The inner circumferential surface opening 812b is formed on the downstream side of the inner circumferential surface opening 812a. The inner circumferential surface opening 812b is connected to the sixth flow hole 813.

The inner circumferential surface opening 812a corresponds to an example of the "fifth opening" in one or more embodiments of the present invention, the inner circumferential surface opening 812b corresponds to an example of the "fourth opening" in one or more embodiments of the present invention, and the connection part 815 corresponds to an example of the "second connection part" in one or more embodiments of the present invention.

As shown in FIG. 3 and FIG. 4, the central axis $CA_2$ of the fifth flow hole 812 does not intersect the central axis $CA_1$ of the fourth flow hole 811. In other words, the central axis $CA_2$ is in a twisted position with respect to the central axis $CA_1$. Strictly speaking, the straight line obtained by extending the central axis $CA_1$ does not intersect the central axis $CA_2$, and the straight line obtained by extending the central axis $CA_1$ is in a twisted position with respect to the central axis $CA_2$.

As shown in FIG. 4, since the central axes $CA_1$ and $CA_2$ do not intersect, the connection part 815 swirls the flow of the coolant flowing into the fifth flow hole 812 along the inner circumferential surface 812e of the fifth flow hole 812 to form a swirl flow $SF_1$. Therefore, as shown in FIG. 5, in the fifth flow hole 812, the swirl flow $SF_1$ swirls around the central axial $CA_2$ along the inner circumferential surface 812e and flows toward −Y direction in the drawing. In this manner, the coolant can easily flow toward the sixth flow hole 813 by swirling the flow of the coolant in the fifth flow hole 812.

The swirl flow $SF_1$ corresponds to an example of the "second swirl flow" in one or more embodiments of the present invention, and the connection part 815 corresponds to an example of the "second swirl flow forming part" in one or more embodiments of the present invention.

Figure 6:
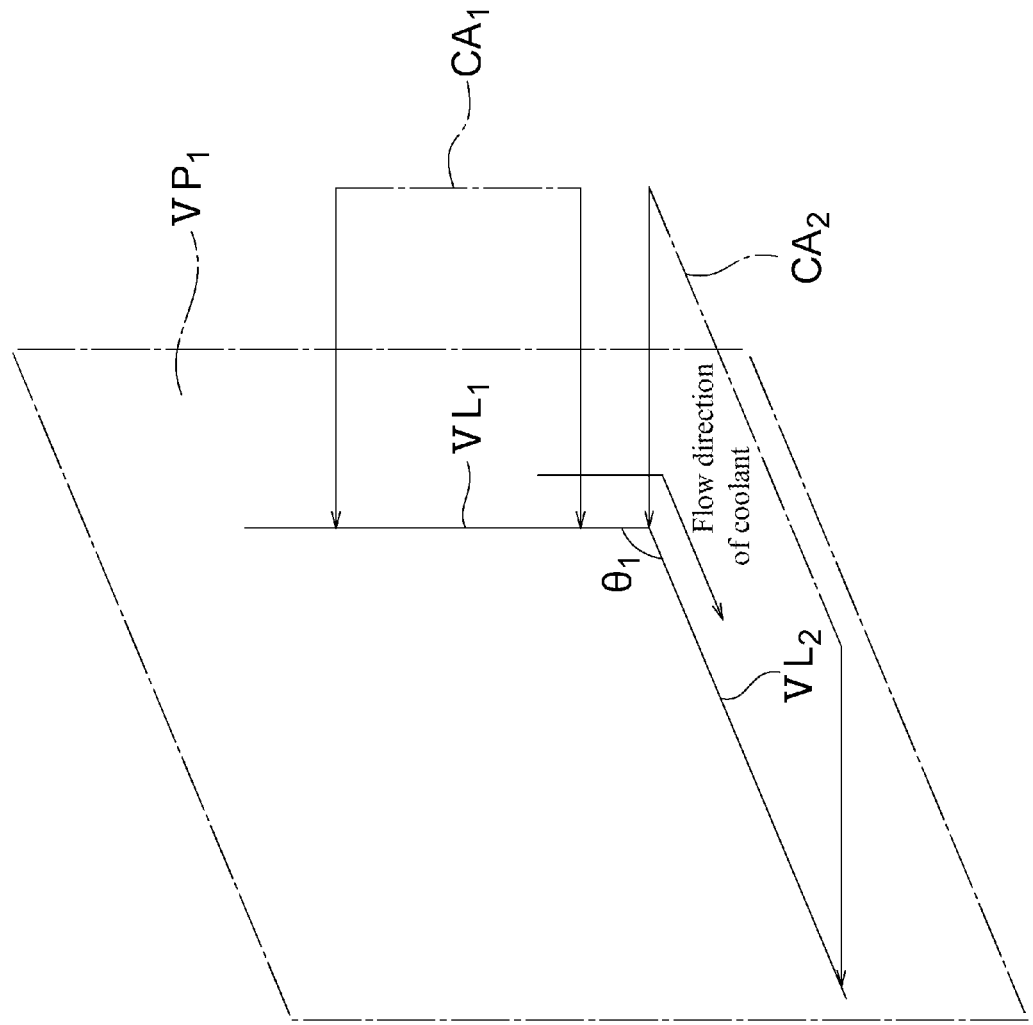
FIG. 6 is a perspective view showing an intersection angle between a virtual straight line obtained by projecting the center axis of the fourth flow hole on a virtual plane and a virtual straight line obtained by projecting the center axis of the fifth flow hole on the virtual plane.

FIG. 6 is a perspective view showing an intersection angle $\theta_1$ between a virtual straight line $VL_1$ obtained by projecting the center axis $CA_1$ of the fourth flow hole 811 on a virtual plane $VP_1$ and a virtual straight line $VL_2$ obtained by projecting the center axis $CA_2$ of the fifth flow hole 812 on the virtual plane $VP_1$. The virtual straight line $VL_1$ corresponds to an example of the "sixth virtual straight line" in one or more embodiments of the present invention, the virtual straight line $VL_2$ corresponds to an example of the "fifth virtual straight line" in one or more embodiments of the present invention, and the virtual plane $VP_1$ corresponds to an example of the "third virtual plane" in one or more embodiments of the present invention.

The virtual plane $VP_1$ shown in FIG. 6 is a virtual plane parallel to the central axes $CA_1$ and $CA_2$ of the fourth and fifth flow holes 811 and 812. In one or more embodiments, the virtual plane $VP_1$ is a plane parallel to the YZ plane. The virtual straight line $VL_1$ is a virtual straight line obtained by projecting the center axis $CA_1$ of the fourth flow hole 811 onto the virtual plane $VP_1$ along the −X direction in the drawing. The virtual straight line $VL_2$ is a virtual straight line obtained by projecting the center axis $CA_2$ of the fifth flow hole 812 onto the virtual plane $VP_1$ along the −X direction in the drawing.

In one or more embodiments, the intersection angle $\theta_1$ of the virtual straight lines $VL_1$ and $VL_2$ is preferably 90° to 120° ($90° \leq \theta_1 \leq 120°$). When the intersection angle $\theta_1$ satisfies the above-described range, the swirl flow $SF_1$ is easily generated by the connecting portion 815. The intersection angle $\theta_1$ is an angle surrounded by the flow direction of the coolant from the fourth flow hole 811 to the fifth flow hole 812 among the four intersection angles of the virtual straight line $VL_1$ and $VL_2$ on the virtual plane $VP_1$.

Further, as shown in FIG. 4, a part of the inner circumferential surface 812e of the fifth flow hole 812 is connected with a part of the inner circumferential surface 811e of the fourth flow hole 811 in the connection part 815 in a flush shape. That is, in the connection part 815, there is almost no step between the inner circumferential surface 811e and the inner circumferential surface 812e. In one or more embodiments, a part of the inner circumferential surface 811e of the fourth flow hole 811 is aligned with the tangent line of the circle formed from the radial cross section of the fifth flow hole 812, and a part of the inner circumferential surface 811e of the fourth flow hole 811 is smoothly connected to the inner circumferential surface 812e of the fifth flow hole 812 at a contact point with the circle. In this manner, since a part of the inner circumferential surface 811e and a part of the inner circumferential surface 812e are flush with each other, the swirl flow $SF_1$ is easily generated by the connection part 815.

As shown in FIG. 3 and FIG. 5, the sixth flow hole 813 is a hole extending linearly along the Z direction in the drawing in the first manifold 81. As shown in FIG. 5, the sixth flow hole 813 of one or more embodiments also has a cylindrical shape. It is not necessary that the sixth flow hole 813 extends linearly, and the sixth flow hole may extend curvedly, for example. The cross-sectional shape of the sixth flow hole 813 is not limited to a circular shape and may be a polygonal shape such as a rectangle. The sixth flow hole 813 corresponds to an example of the "second flow path" in one or more embodiments of the present invention.

The plurality of sixth flow holes 813 are disposed on the downstream side of the single fifth flow hole 812 and are connected to the fifth flow hole 812 in a connection part 816. In one or more embodiments, the plurality of sixth flow holes 813 are connected to the single fifth flow hole 812 so that the flow path of the coolant branches into the plurality of flow paths.

The sixth through hole 813 includes a pair of end openings 813a and 813b. The end opening 813a is formed at the upper end 813c of the sixth flow hole 813 and is connected to the inner circumferential surface opening 812b of the fifth flow hole 812 described above. On the other hand, the end opening 813b is formed at the lower end 813d of the sixth flow hole 813 and is connected to the seventh flow hole 814.

The lower end 813d corresponds to an example of the "first end" in one or more embodiments of the present invention, the upper end 813c corresponds to an example of the "second end" in one or more embodiments of the present invention, the end opening 813a corresponds to an example of the "third opening" in one or more embodiments of the present invention, and the end opening 813b corresponds to an example of the "second opening" in one or more embodiments of the present invention.

Figure 7:
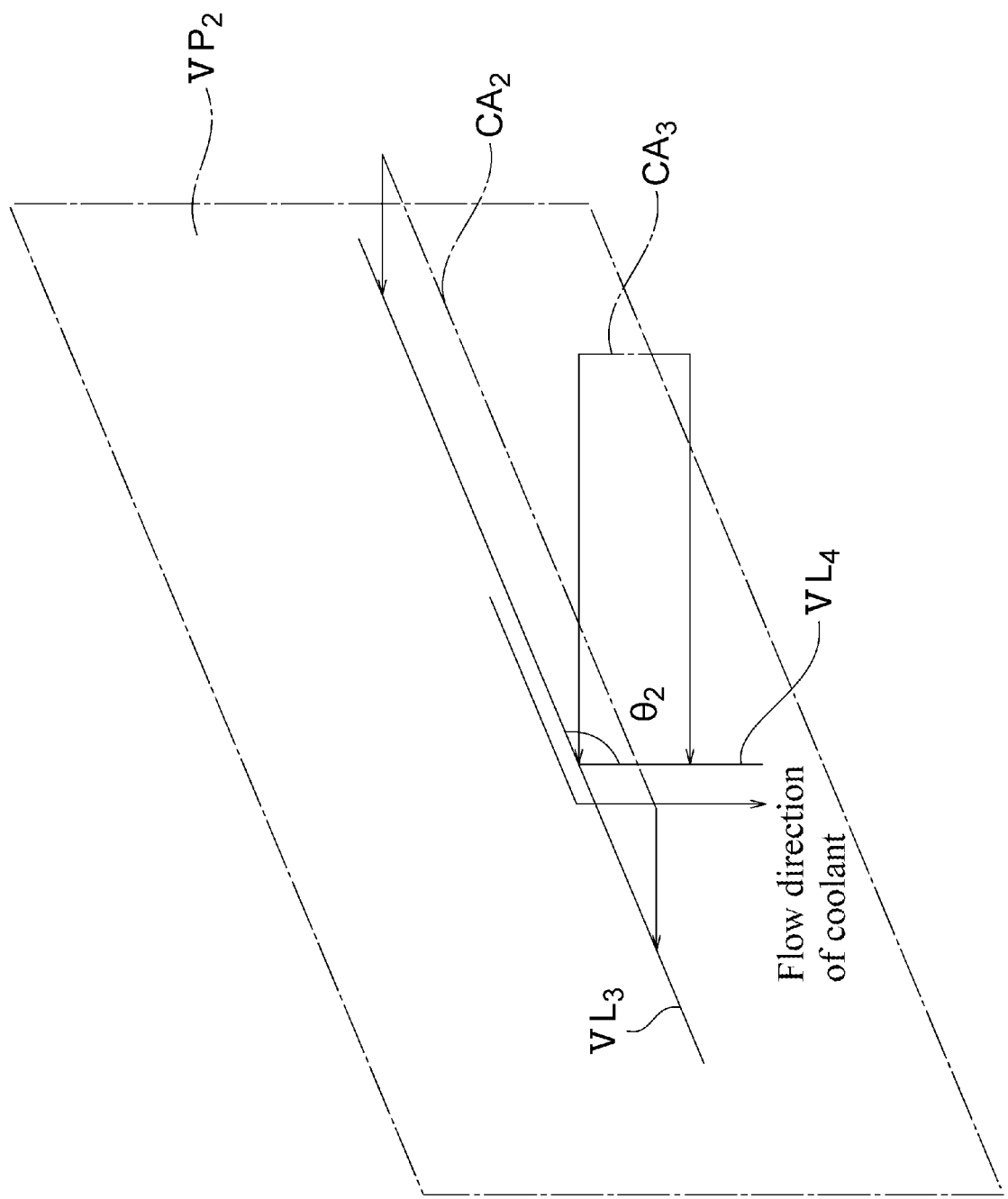
FIG. 7 is a perspective view showing an intersection angle between a virtual straight line obtained by projecting the center axis of the fifth flow hole on a virtual plane and a virtual straight line obtained by projecting the center axis of the sixth flow hole on the virtual plane.

FIG. 7 is a perspective view showing an intersection angle $\theta_2$ between a virtual straight line $VL_3$ obtained by projecting the center axis $CA_2$ of the fifth flow hole 812 on a virtual plane $VP_2$ and a virtual straight line $VL_4$ obtained by projecting the center axis $CA_3$ of the sixth flow hole 318 on the virtual plane $VP_2$. The virtual straight line $VL_3$ corresponds to an example of the "fourth virtual straight line" in one or more embodiments of the present invention, the virtual straight line $VL_4$ corresponds to an example of the "third virtual straight line" in one or more embodiments of the present invention, and the virtual plane $VP_2$ corresponds to an example of the "second virtual plane" in one or more embodiments of the present invention.

The virtual plane $VP_2$ shown in FIG. 7 is a virtual plane parallel to the central axes $CA_2$ and $CA_3$ of the fifth and sixth flow holes 812 and 813. In one or more embodiments, the virtual plane $VP_2$ is a plane parallel to the YZ plane. The virtual straight line $VL_3$ is a virtual straight line obtained by projecting the center axis $CA_2$ of the fifth flow hole 812 onto the virtual plane $VP_2$ along the $-X$ direction in the drawing. The virtual straight line $VL_4$ is a virtual straight line obtained by projecting the center axis $CA_3$ of the sixth flow hole 813 onto the virtual plane $VP_2$ along the $-X$ direction in the drawing.

In one or more embodiments, the intersection angle $\theta_2$ of the virtual straight lines $VL_3$ and $VL_4$ is preferably 90° to 120° ($90° \leq \theta_2 \leq 120°$). When the intersection angle $\theta_2$ satisfies the above-described range, since the coolant can easily flow from the fifth flow hole 812 to the sixth flow hole 813, it is possible to suppress a decrease in the flow rate of the coolant inside the sixth flow hole 813. The intersection angle $\theta_2$ is an angle surrounded by the flow direction of the coolant from the fifth flow hole 812 to the sixth flow hole 813 among the four intersection angles of the virtual straight line $VL_3$ and $VL_4$ on the virtual plane $VP_2$.

Figure 8:
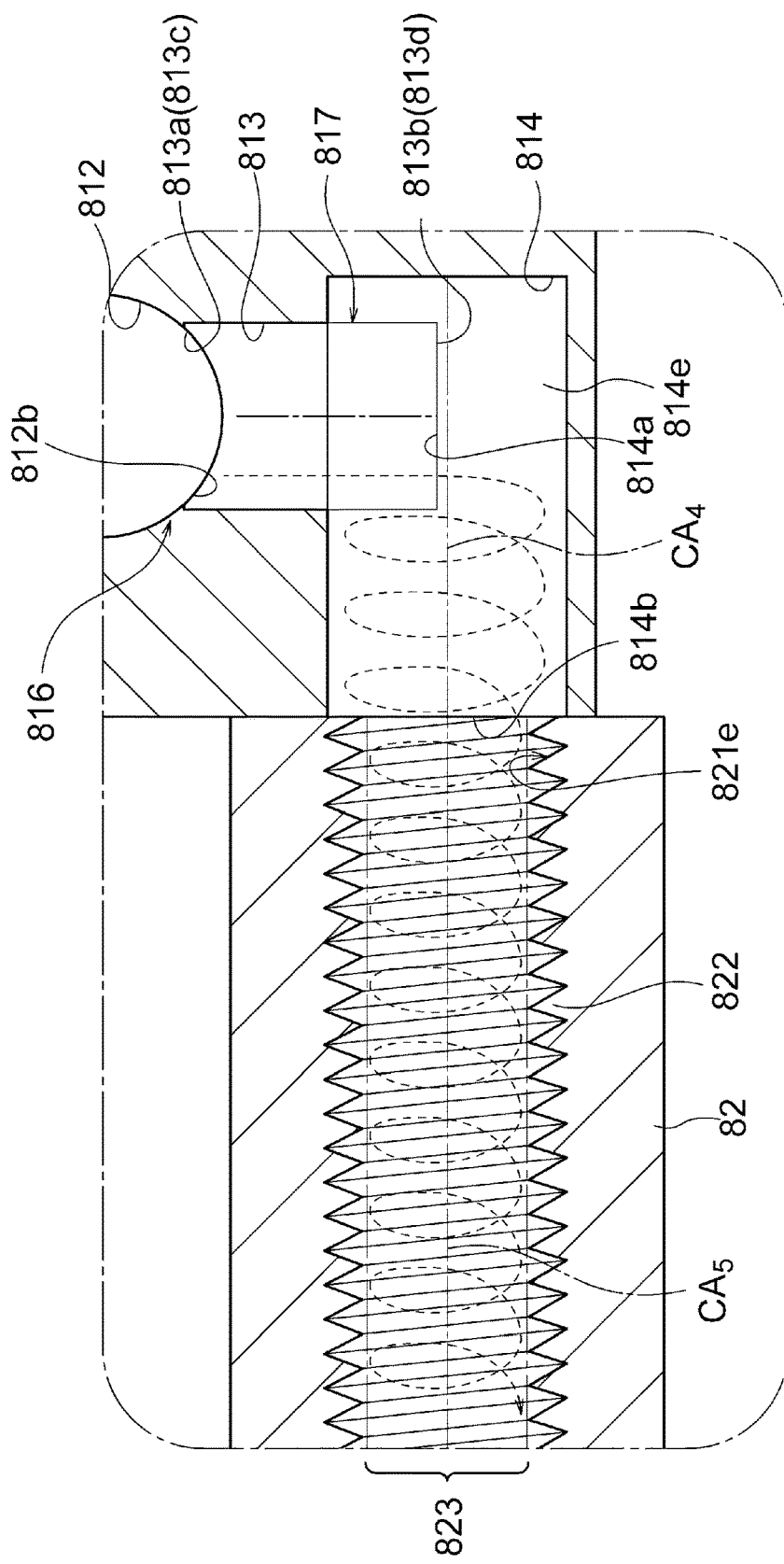
FIG. 8 is a cross-sectional view along VIII-VIII line of FIG. 3.

FIG. 8 is a cross-sectional view along VIII-VIII line of FIG. 3. As shown in FIG. 3 and FIG. 8, the seventh flow hole 814 is a hole extending linearly along the X direction in the drawing in the first manifold 81. The seventh flow hole 814 of one or more embodiments also has a cylindrical shape similarly to the fourth to sixth flow hole 811 to 813, and the cross-sectional shape of the fifth flow hole 812 in the radial direction is also circular.

The seventh flow hole 814 is disposed on the downstream side of the sixth flow hole 813 to cross the lower end 813d of the sixth flow hole 813 in the connection part 817. The seventh flow hole 814 has an inner circumferential surface opening 814a and an end opening 814b. The inner circumferential surface opening 814a is connected to the end opening 813b of the sixth flow hole 813, and the sixth flow hole 813 and the seventh flow hole 814 are connected to each other in the connection part 817. The end opening 814b is connected to an eighth flow hole 821 (described later).

The connection part 817 corresponds to an example of the "first connection part" in one or more embodiments of the present invention, and the inner circumferential surface opening 814a corresponds to an example of the "first opening" in one or more embodiments of the present invention.

As shown in FIG. 5, the central axis $CA_4$ of the seventh flow hole 814 does not intersect the central axis $CA_3$ of the sixth flow hole 813. In other words, the central axis $CA_4$ is in a twisted position with respect to the central axis $CA_3$. Strictly speaking, the straight line obtained by extending the central axis $CA_3$ does not intersect the central axis $CA_4$, and the straight line obtained by extending the central axis $CA_3$ is in a twisted position with respect to the central axis $CA_4$.

Since the central axes $CA_3$ and $CA_4$ do not intersect, the connection part 817 swirls the flow of the coolant flowing into the seventh flow hole 813 along the inner circumferential surface 814e of the seventh flow hole 814 to form a swirl flow $SF_2$. Therefore, as shown in FIG. 8, in the seventh flow hole 814, the swirl flow $SF_2$ swirls around the central axial $CA_4$ along the inner circumferential surface 814e and flows toward $-X$ in the drawing. The swirl flow $SF_2$ flows toward the eighth flow hole 821.

The swirl flow $SF_2$ corresponds to an example of the "first swirl flow" in one or more embodiments of the present invention, and the connection part 817 corresponds to an example of the "first swirl flow forming part" in one or more embodiments of the present invention.

Figure 9:
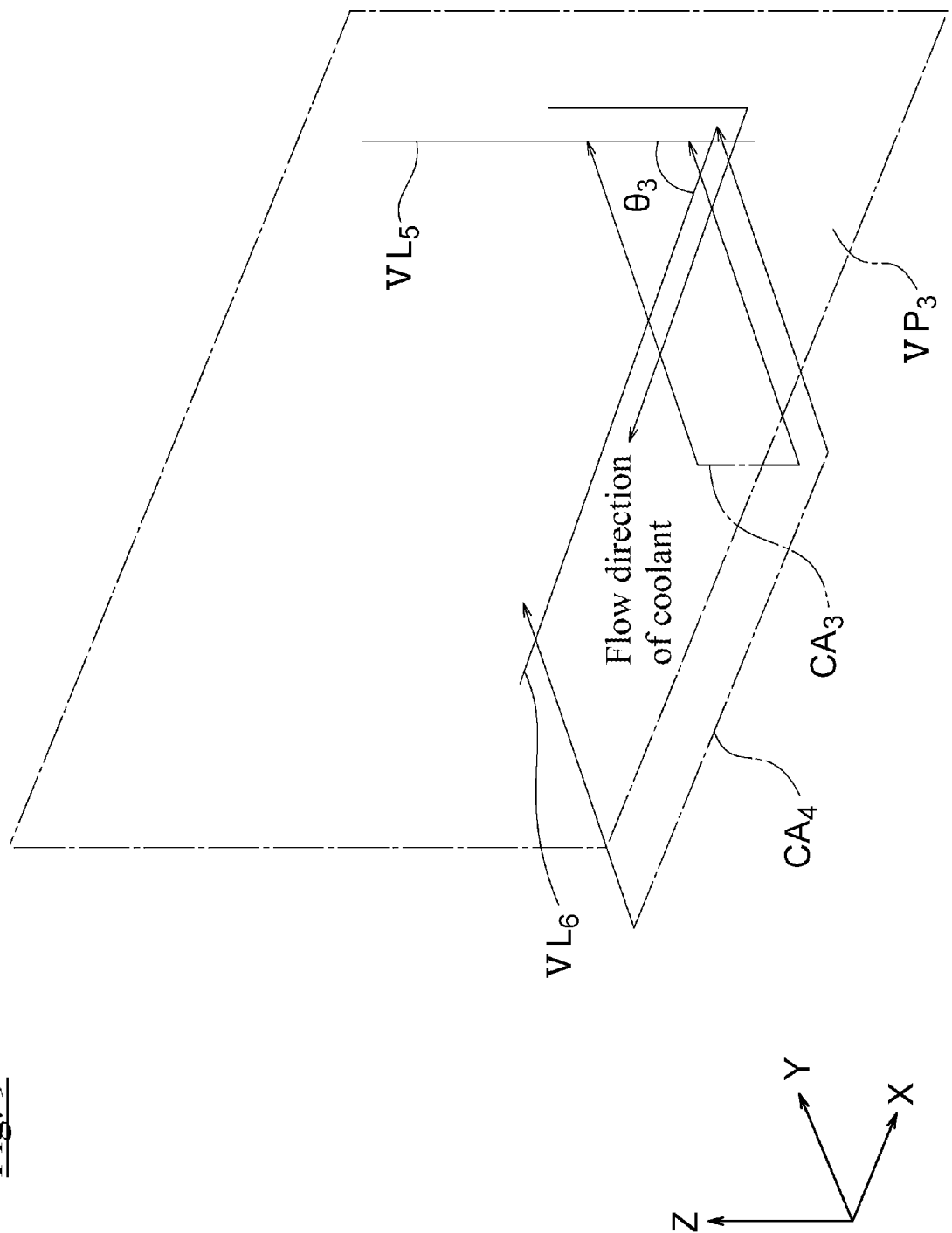
FIG. 9 is a perspective view showing an intersection angle between a virtual straight line obtained by projecting the center axis of the sixth flow hole on a virtual plane and a virtual straight line obtained by projecting the center axis of the seventh flow hole on the virtual plane.

FIG. 9 is a perspective view showing an intersection angle $\theta_3$ between a virtual straight line $VL_5$ obtained by projecting the center axis $CA_3$ of the sixth flow hole 813 on a virtual plane $VP_3$ and a virtual straight line $VL_6$ obtained by projecting the center axis $CA_4$ of the seventh flow hole 814 on the virtual plane $VP_3$. The virtual straight line $VL_5$ corresponds to an example of the "second virtual straight line" in one or more embodiments of the present invention, the virtual straight line $VL_6$ corresponds to an example of the "first virtual straight line" in one or more embodiments of the present invention, and the virtual plane $VP_3$ corresponds to an example of the "first virtual plane" in one or more embodiments of the present invention.

The virtual plane $VP_3$ shown in FIG. 9 is a virtual plane parallel to the central axes $CA_3$ and $CA_4$ of the sixth and seventh flow holes 813 and 814. In one or more embodiments, the virtual plane $VP_3$ is a plane parallel to the XZ plane. The virtual straight line $VL_5$ is a virtual straight line obtained by projecting the center axis $CA_3$ of the sixth flow hole 813 onto the virtual plane $VP_3$ along the +Y direction in the drawing. The virtual straight line $VL_6$ is a virtual straight line obtained by projecting the center axis $CA_4$ of the seventh flow hole 814 onto the virtual plane $VP_3$ along the +Y direction in the drawing.

In one or more embodiments, the intersection angle $\theta_3$ of the virtual straight lines $VL_5$ and $VL_6$ is preferably 90° to 120° ($90° \leq \theta_3 \leq 120°$). When the intersection angle $\theta_3$ satisfies the above-described range, the swirl flow $SF_2$ is easily generated by the connecting portion 817. The intersection angle $\theta_3$ is an angle surrounded by the flow direction of the coolant from the sixth flow hole 813 to the seventh flow hole 814 among the four intersection angles of the virtual straight line $VL_5$ and $VL_6$ on the virtual plane $VP_3$.

Further, as shown in FIG. 5, a part of the inner circumferential surface 813e of the sixth flow hole 813 is connected with a part of the inner circumferential surface 814e of the seventh flow hole 814 in the connection part 817 in a flush shape. That is, in the connection part 817, there is almost no step between the inner circumferential surface 813e and the inner circumferential surface 814e. In one or more embodiments, a part of the inner circumferential surface 813e of the sixth flow hole 813 is aligned with the tangent line of the circle formed from the radial cross section of the seventh flow hole 814, and a part of the inner circumferential surface 813e of the sixth flow hole 813 is smoothly connected to the inner circumferential surface 814e of the seventh flow hole 814 at a contact point with the circle. In this manner, since a part of the inner circumferential surface 813e and a part of the inner circumferential surface 814e are flush with each other, the swirl flow $SF_2$ is easily generated by the connection part 817.

As shown in FIG. 2, the heat exchange member 82 is held between the first and second manifolds 81 and 83. The heat exchange member 82 of one or more embodiments contacts the DUT 300 and presses the DUT 300 against the socket 24 when the contact arm 6 lowers the pusher 7. Thus, the heat exchange member 82 of one or more embodiments is thermally connected to the DUT 300 by directly contacting the DUT 300.

The heat exchange member 82 has eighth flow holes 821. The eighth flow hole 821 is a hole extending linearly along the −X direction in the drawing in the heat exchange member 82 and penetrates the heat exchange member 82. As shown in FIG. 8, the eighth flow hole 821 is connected to the end opening 814b of the above-described seventh flow hole 814, and the central axis $CA_5$ of the eighth flow hole 821 is aligned with the central axis $CA_4$ of the seventh flow hole 814. The swirl flow $SF_2$ flowing into the eighth flow hole 821 from the seventh flow hole 814 swirls around the central axis $CA_5$ of the eighth flow hole 821 along the inner circumferential surface 821e. The coolant cools the DUT 300 via the heat exchange member 82.

The eighth flow hole 821 includes a spiral wall 822 and a through hole 823. The spiral wall 822 is erected on the inner circumferential surface 821e of the eighth flow hole 821. The spiral wall 822 extends continuously in a spiral shape along the inner circumferential surface 821e. The spiral wall 822 has a height up to a position away from the central axial $CA_5$.

Since the spiral wall 822 does not reach the central axis $CA_5$, the through hole 823 is formed around the central axis $CA_5$ of the eighth flow hole 821. The through-hole 823 is a through hole surrounded by the spiral wall 822. A female screw is formed on the inner circumferential surface 821e of the eighth flow hole 821 by the spiral wall 822 and the through hole 823 as described above.

Since the eighth flow hole 821 has the spiral wall 822 as described above, it is possible to increase the area of the inner circumferential surface 821e, and thus it is possible to increase the contacting area between the coolant and the heat exchanging member 82 in the eighth flow hole 821. Therefore, since it is possible to improve the heat exchange efficiency between the coolant and the heat exchange member 82, it is also possible to improve the heat exchange efficiency between the coolant and the DUT 300.

As shown in FIG. 2, the second manifold 83 is connected to the lower surface of the pusher base 71. The second manifold 83 has a ninth flow hole 831. The ninth flow hole 831 is connected to the eighth flow hole 821 of the heat exchange member 82. The coolant after heat exchange with the DUT 300 is discharged to the outside of the pusher 7 through the ninth flow hole 831. The seventh to ninth flow holes 814, 821 and 831 correspond to an example of the "first flow path" in one or more embodiments of the present invention.

The second manifold 83 may also have fourth to seventh flow holes similarly to the first manifold 81. In this case, the heat exchange member 82 further includes an eighth flow hole connected to the seventh flow hole of the second manifold 83, and the first manifold also includes a ninth flow hole connected to the eighth flow hole.

As shown in FIG. 2, the heating unit 84 is connected to the lower surface of the pusher base 71. The heating unit 84 is disposed between the first and second manifolds 81 and 83 and is disposed on the heat exchange member 82. The heating unit 84 includes a heater 841 and a temperature sensor 842.

The heater 841 is a heat source and adjusts the temperature of the heat exchange member 82. The temperature sensor 842 detects the temperature of the heat exchange member 82. The detected value can be used for the PID control described above. As a specific example of the heater 841, a ceramic heater, a polyimide heater, or the like can be exemplified. The heater 841 may be disposed below the heat exchange member 82. In this case, the heat exchange member 82 is thermally connected to the DUT 300 via the heater 841.

Conventionally, the coolant flows parallel to the extending direction of the flow path in the flow path. Therefore, the contact distance between the coolant and the inner surface of the flow path is short. Further, conventionally, the flow of the coolant in the flow path is a laminar flow flowing along the extending direction of the flow path. In such a laminar flow, the flow velocity of the coolant in the vicinity of the center of the flow path is fast, while the flow velocity of the coolant in the vicinity of the inner surface of the flow path is slow. Therefore, the efficiency of heat exchange between the coolant and the DUT may deteriorate.

On the other hand, in the above-described electronic component test apparatus of one or more embodiments, the swirl flow $SF_2$ of the coolant flows in the eighth flow hole 821 while swirling along the inner circumferential surface 821e about the central axial $CA_5$. Therefore, it is possible to increase the contact distance between the fluid and the inner circumferential surface 821e, and it is possible to improve the velocity of the fluid in the vicinity of the inner circumferential surface 821e of the eighth flow hole 821. Therefore, since it is possible to improve the efficiency of heat exchange between the coolant and the DUT 300, it is possible to improve the responsiveness in temperature adjustment of the DUT 300.

In particular, when liquid nitrogen is conventionally used as a coolant, film boiling of liquid nitrogen may occur in the vicinity of the inner surface of the flow path. That is, the temperature of the liquid nitrogen in contact with the inner surface of the flow path rises and boils, thereby a film composed of nitrogen vapor may be formed in the vicinity of the inner surface. Therefore, liquid nitrogen may be hardly supplied to the vicinity of the inner surface and the heat exchange efficiency may decrease.

On the other hand, in one or more embodiments, since the swirl flow $SF_2$ of the coolant flows along the inner circumferential surface 821e of the eighth flow hole 821 by the centrifugal force centered on the central axial $CA_5$, even if the mist-like or liquid-like nitrogen boils, it is possible to supply the mist-like or liquid-like nitrogen to the vicinity of the inner circumferential surface 821e. Therefore, since it is possible to improve the heat exchange efficiency, it is possible to improve the responsiveness in temperature adjustment of the DUT 300.

It should be noted that the embodiments described above are described to facilitate understanding of the present disclosure and are not described to limit the present disclosure. It is therefore intended that the elements disclosed in the above embodiments include all design modifications and equivalents to fall within the technical scope of the present disclosure.

In the above-described embodiments, although the pusher 7 holds by suction the DUT 300, the object held by the pusher 7 is not limited to this. The pusher 7 may hold by suction the carrier 400 (see FIG. 1) containing the DUT. Although such a carrier is not particularly limited, for example, the carriers described in JP 2019-197012 A and JP 2013-79860 A can be used.

The pusher 7 may press a plurality of the DUTs 300 held on a test tray. In this case, the handler 3 includes a plurality of pushers 7, and the plurality of pushers 7 respectively press a plurality of the DUTs 300 held on the test tray. In this case, all pushers 7 may have the configuration as in the embodiments described above. Alternatively, the carrier 400 containing the DUT 300 may be mounted on the test tray.

The first to fourth flow paths of one or more embodiments are all formed of linear holes but are not limited to this. The first to fourth flow paths may include pipes made of resin or metal or may include a gap formed between two members.

Although the fluid is supplied from the socket guide 25 to the pusher 7 in the above-described embodiments, the fluid supply route is not particularly limited to this. For example, the fluid may be supplied to the temperature adjustment apparatus 8 via a flow path disposed in the contact arm 6. Alternatively, the fluid may be supplied to the temperature adjustment apparatus 8 from the outside of the contact arm 6.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS

100 . . . Electronic component test apparatus
2 . . . Tester
21 . . . Main frame
22 . . . Test head
23 . . . Cable
24 . . . Socket
241 . . . Socket body
242 . . . Contactor
25 . . . Socket guide
251 . . . Socket accommodation part
252 . . . Fitting part
252a . . . Fitting hole
253 . . . First flow hole
3 . . . Handler
4 . . . Thermostatic chamber
5 . . . Coolant supply unit
51 . . . Fluid connection part (or Fluid connector)
52 . . . Valve
53 . . . Valve controller
6 . . . Contact arm
7 . . . Pusher
71 . . . Pusher base
711 . . . Third flow hole
72 . . . Fitting pin
721 . . . Second flow hole
8 . . . Temperature control device
81 . . . First manifold
811 to 814 . . . Fourth to seventh flow hole
811a, 811b, 813a, 813b, 814b . . . End opening
811c, 813c . . . Upper end
811d, 813d . . . Lower end
812a, 812b, 814a . . . Inner circumferential surface opening
811e to 814e . . . Inner circumferential surface
815 to 817 . . . Connection part
82 . . . Heat exchange member
821 . . . Eighth flow hole
821a . . . Inner circumferential surface
822 . . . Spiral wall
823 . . . Through hole
83 . . . Second manifold
831 . . . Ninth flow hole
$CA_1$ to $CA_4$ . . . Central axis
$VL_1$ to $VL_6$ . . . Virtual straight line
$VP_1$ to $VP_3$ . . . Virtual plane
84 . . . Heating unit
841 . . . Heater
832 . . . Thermal sensor
200 . . . Coolant supply source
300 . . . DUT

What is claimed is:

1. A temperature adjusting device that adjusts a temperature of a device under test (DUT) electrically connected to a socket, the temperature adjusting device comprising:
    a fluid connector connected to a fluid supply source that supplies a fluid;
    a heat exchanger thermally connected to the DUT or a carrier holding the DUT in a state that the DUT or the carrier is pressed against the socket;
    a first flow path passing through an inside of the heat exchanger;
    a first swirl flow forming part that swirls a flow of the fluid to form a first swirl flow and supplies the first swirl flow to the first flow path;
    a second flow path disposed on an upstream side of the first flow path and connected to the first flow path, wherein
    the first swirl flow swirls along an inner surface of the first flow path around a first central axis of the first flow path,
    the second flow path has a second central axis that does not intersect the first central axis, and
    the first swirl flow forming part is a first connection part where the first flow path and the second flow path are connected to each other.

2. The temperature adjusting device according to claim 1, wherein
    a cross section of the first flow path along a radial direction of the first flow path has a circular shape,
    the first flow path includes a first opening that is formed in an inner circumferential surface of the first flow path,
    the second flow path includes a second opening that is formed at a first end of the second flow path, and
    the first opening and the second opening are connected to each other in the first connection part.

3. The temperature adjusting device according to claim 1, wherein
    a part of an inner surface of the second flow path is connected with a part of the inner circumferential surface of the first flow path in the first connection part in a flush shape.

4. The temperature adjusting device according to claim 1, wherein
    an intersection angle between a first virtual straight line and a second virtual straight line is 90° to 120°,
    the first virtual straight line is a virtual straight line obtained by projecting the first central axis onto a first virtual plane,
    the second virtual straight line is a virtual straight line obtained by projecting the second central axis onto the first virtual plane, and
    the first virtual plane is a virtual plane that is parallel to the first central axis and the second central axis.

5. The temperature adjusting device according to claim 1, further comprising:
    a third flow path disposed on an upstream side of the second flow path and connected to the second flow path; and
    a second swirl flow forming part that swirls a flow of the fluid to form a second swirl flow and supplies the second swirl flow to the third flow path, wherein
    the second swirl flow swirls along an inner surface of the third flow path around a third central axis of the third flow path.

6. The temperature adjusting device according to claim 5, wherein
    a cross section of the third flow path along a radial direction of the third flow path has a circular shape,
    the second flow path includes a third opening that is formed at a second end of the second flow path,
    the third flow path includes a fourth opening that is formed in an inner circumferential surface of the third flow path, and
    the third opening and the fourth opening are connected to each other.

7. The temperature adjusting device according to claim 5, wherein
    an intersection angle between a third virtual straight line and a fourth virtual straight line is 90° to 120°,
    the third virtual straight line is a virtual straight line obtained by projecting the second central axis onto a second virtual plane,
    the fourth virtual straight line is a virtual straight line obtained by projecting the third central axis onto the second virtual plane, and
    the second virtual plane is a virtual plane that is parallel to the second central axis and the third central axis.

8. The temperature adjusting device according to claim 5, further comprising:
    a fourth flow path disposed on an upstream side of the third flow path and connected to the third flow path, wherein
    the fourth flow path has a fourth central axis that does not intersect the third central axis, and
    the second swirl flow forming part is a second connection part where the third flow path and the fourth flow path are connected to each other.

9. The temperature adjusting device according to claim 8, wherein
    a cross section of the third flow path along a radial direction of the third flow path has a circular shape,
    the third flow path includes a fifth opening that is formed in an inner circumferential surface of the third flow path,
    the fourth flow path includes a sixth opening that is formed at a third end of the fourth flow path, and
    the fifth opening and the sixth opening are connected to each other in the second connection part.

10. The temperature adjusting device according to claim 1, wherein
    an intersection angle between a fifth virtual straight line and a sixth virtual straight line is 90° to 120°,
    the fifth virtual straight line is a virtual straight line obtained by projecting the third central axis onto a third virtual plane,
    the sixth virtual straight line is a virtual straight line obtained by projecting the fourth central axis onto the third virtual plane, and
    the third virtual plane is a virtual plane that is parallel to the third central axis and the fourth central axis.

11. The temperature adjusting device according to claim 5, further comprising:
    a plurality of first flow paths each passing through the inside of the heat exchanger; and
    a plurality of second flow paths each disposed on the upstream side of each of the first flow paths and connected to each of the first flow paths, wherein
    the second flow paths are connected to the third flow path.

12. The temperature adjusting device according to claim 1, wherein
    the first flow path has a spiral wall disposed on the inner surface of the first flow path and extending in a spiral shape, and a female thread is formed by the spiral wall on the inner surface of the first flow path.

13. The temperature adjusting device according to claim 1, wherein
the fluid is mist-like or liquid-like nitrogen.

14. An electronic component handling apparatus that handles a DUT or a carrier holding the DUT, the electronic component handling apparatus comprising:
a pushing device that:
comprises the temperature adjusting device according to claim 1, and presses the DUT or the carrier against a socket.

15. An electronic component test apparatus that tests a DUT, the electronic component test apparatus comprising:
the electronic component handling apparatus according to claim 14; and
a tester that comprises the socket.

* * * * *